(12) United States Patent
Turney et al.

(10) Patent No.: US 10,211,491 B2
(45) Date of Patent: Feb. 19, 2019

(54) MANAGEMENT OF GAS PRESSURE AND ELECTRODE STATE OF CHARGE IN ALKALINE BATTERIES

(71) Applicant: Research Foundation of the City University of New York, New York, NY (US)

(72) Inventors: Damon Turney, Brooklyn, NY (US); Yasumasa Ito, Nagoya (JP); Sanjoy Banerjee, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 944 days.

(21) Appl. No.: 14/380,316

(22) PCT Filed: Feb. 22, 2013

(86) PCT No.: PCT/US2013/027510
§ 371 (c)(1),
(2) Date: Aug. 21, 2014

(87) PCT Pub. No.: WO2013/126839
PCT Pub. Date: Aug. 29, 2013

(65) Prior Publication Data
US 2015/0064512 A1 Mar. 5, 2015

Related U.S. Application Data

(60) Provisional application No. 61/602,325, filed on Feb. 23, 2012.

(51) Int. Cl.
*H01M 10/52* (2006.01)
*H01M 10/48* (2006.01)
(Continued)

(52) U.S. Cl.
CPC ....... *H01M 10/523* (2013.01); *C25B 11/0447* (2013.01); *C25B 11/0452* (2013.01);
(Continued)

(58) Field of Classification Search
None
See application file for complete search history.

(56) References Cited

U.S. PATENT DOCUMENTS 2,578,027 A * 12/1951 Tichenor ............... H01M 10/44
204/228.4
5,569,554 A    10/1996 Tsenter
(Continued)

FOREIGN PATENT DOCUMENTS

CN         1132350        10/1996
DE    102006003197 A1     7/2007
(Continued)

OTHER PUBLICATIONS

Foreign communication from a related counterpart application—European Search Report, Application No. 13751954.2, dated Sep. 9, 2015, 6 pages.
(Continued)

*Primary Examiner* — Carmen V Lyles-Irving
(74) *Attorney, Agent, or Firm* — Conley Rose, P.C.; Andrew M. Metrailer (57) ABSTRACT

An inventive, new system that measures gas composition and pressure in the headspace of an aqueous electrolyte battery is described. The system includes a microcontroller that can use the composition and pressure information to connect a third electrode to either the anode(s) or the cathode(s) in order to balance the state of charge between the two. Results have shown that such a system can control the
(Continued)

gas pressure inside a sealed flooded aqueous electrolyte battery to remain below 20 kPa (3 psi) and greatly extend the useable life of the battery.

12 Claims, 4 Drawing Sheets (51) Int. Cl.
H01M 10/42 (2006.01)
C25B 11/04 (2006.01)
H01M 4/24 (2006.01)
H01M 4/32 (2006.01)
H01M 4/34 (2006.01)
H01M 4/90 (2006.01)
H01M 4/92 (2006.01)
H01M 10/34 (2006.01)
H01M 10/24 (2006.01)

(52) U.S. Cl.
CPC ............ *H01M 4/24* (2013.01); *H01M 4/244* (2013.01); *H01M 4/248* (2013.01); *H01M 4/32* (2013.01); *H01M 4/34* (2013.01); *H01M 4/9041* (2013.01); *H01M 4/921* (2013.01); *H01M 10/34* (2013.01); *H01M 10/425* (2013.01); *H01M 10/4257* (2013.01); *H01M 10/48* (2013.01); *H01M 4/90* (2013.01); *H01M 10/24* (2013.01); *H01M 2010/4271* (2013.01); *H01M 2200/20* (2013.01)

(56) References Cited

U.S. PATENT DOCUMENTS

| | | | |
|---|---|---|---|
| 5,650,711 | A | 7/1997 | Kang |
| 7,288,920 | B2 | 10/2007 | Bushong et al. |
| 2005/0175877 | A1 | 8/2005 | Hong |
| 2008/0090134 | A1 | 4/2008 | Berg |
| 2010/0285338 | A1* | 11/2010 | Christensen .......... H01M 4/134 429/50 |
| 2010/0323261 | A1* | 12/2010 | Igarashi ............ H01M 8/04029 429/436 |
| 2011/0189515 | A1 | 8/2011 | Yoon et al. |
| 2011/0309795 | A1 | 12/2011 | Firehammer et al. |
| 2012/0040255 | A1* | 2/2012 | Hermann ............ H01M 16/006 429/407 |

FOREIGN PATENT DOCUMENTS

| | | |
|---|---|---|
| EP | 1029385 B1 | 10/2005 |
| EP | 1946423 B1 | 11/2010 |
| EP | 2817840 A1 | 12/2014 |
| GB | 1484433 | 9/1977 |
| WO | 2013126839 A1 | 8/2013 |

OTHER PUBLICATIONS

Foreign Communication from a related counterpart application—Office Action of Chinese Patent Application No. 201380017302.3 dated Jun. 1, 2016, with English Translation, 16 pages.
Foreign communication from the priority application—International Search Report and Written Opinion, PCT/US2013/027510, dated Jun. 24, 2013, 9 pages.
Foreign communication from the priority application—International Preliminary Report on Patentability, PCT/US2013/027510, dated Aug. 26, 2014, 7 pages.
Filing receipt and specification for provisional patent application entitled "Prevention of hydrophobic dewetting through nanoparticle surface treatment," by Damon Turney, et al., filed Feb. 23, 2012 as U.S. Appl. No. 61/602,325.
Surampudi, S., et al., "Lithium Batteries," 2000, p. 800 entitled, "Palladium-Microencapsulated Graphite as the Nagative Electrode for Li-ion Cells," by Ping Yu, et al., vol. 99-25, Electrochemical Society, Inc., 3 pages.
Misra, S. S., et al., "The role of recombination catalysts in VRLA cells," Journal of Power Sources, 2001, pp. 162-173, vol. 95, Elsevier Science B.V.
Ito, Yasumasa, et al., "Gas evolution in a flow-assisted zinc-nickel oxide battery," Journal of Power Sources, 2011, pp. 6583-6587, vol. 196, Elsevier B.V.
Ito, Yasumasa, et al., "Zinc morphology in zinc-nickel flow assisted batteries and impact on performance," Journal of Power Sources, 2011, pp. 2340-2345, vol. 196, Elsevier B.V.
Foreign Communication from a related counterpart application—First Examination Report of European Application No. 1375195.2 dated Feb. 2, 2017, 4 pages.
Foreign Communication from a related counterpart application—Second Examination Report of Australian Application No. 2013222134 dated Jul. 25, 2017, 3 pages.
Foreign communication from a related application—First Examination Report of India Patent Application No. 9332/DELNP/2013 dated Sep. 26, 2018, 6 pages.

* cited by examiner

MANAGEMENT OF GAS PRESSURE AND ELECTRODE STATE OF CHARGE IN ALKALINE BATTERIES

STATEMENT OF GOVERNMENT SUPPORT

The invention described and claimed herein was made in part utilizing funds supplied by the U.S. Department of Energy under Contract No. DE-EE0004224. The US Government has certain rights in this invention.

CROSS-REFERENCE TO RELATED APPLICATIONS

This application is a filing under 35 U.S.C. 371 of International Application No. PCT/US2013/027510 filed Feb. 22, 2013 which claimed priority to U.S. Provisional Patent Application No. 61/602,325 filed Feb. 23, 2012, which applications are herein incorporated by reference in their entirety.

FIELD OF THE INVENTION

This invention relates generally to batteries, and, more specifically, to methods of safely managing byproduct gases and electrode charge imbalances during cycling.

BACKGROUND OF THE INVENTION

Several common rechargeable aqueous electrolyte battery technologies generate hydrogen gas at the anode and oxygen gas at the cathode through electrolysis of water in the electrolyte. Such battery technologies include, but are not limited to, lead-acid, nickel metal-hydride, silver oxide-zinc, nickel-cadmium, bromine-zinc, manganese-zinc, and nickel-zinc systems. Unfortunately, the electrochemical reactions that generate the gases compete with electrochemical reactions for storing energy. Thus gas generation reduces the efficiency of the battery for storing energy. In addition, if more Coulombs go toward oxygen (hydrogen) gas generation than toward hydrogen (oxygen) gas generation the cathode (anode) has a lower state of charge (SOC) than the anode (cathode), which can lead to overall poor performance and to battery short-circuiting.

A small portion of the generated gas stays on the electrodes as attached bubbles, but the majority (greater than 95%) of the gas mixes in the common headspace of the battery. A process called recombination can convert the hydrogen and oxygen gas to liquid water which can go back into the electrolyte. Recombiners are commonly placed in the headspace in order to do the gas conversion. They are commonly made of high surface area catalytic materials such as platinum or palladium powder. In sealed, valve-regulated lead acid batteries where absorbed glass cloth holds the electrolyte, recombination can also occur when oxygen gas contacts the anode and when hydrogen gas contacts the cathode. The end result is the same: conversion of hydrogen and oxygen gas to water.

The chemical reaction for a recombiner to convert hydrogen and oxygen gas to water is:

$$2H_2(g) + O_2(g) \leftrightarrow 2H_2O(liq)$$

Chemical reaction rates increase monotonically as the concentration of reactants increases and as temperature increases. If either hydrogen or oxygen partial pressure becomes low, below about 3.5 kPa (0.5 psi) for example, the rate of recombination will become very slow.

Current technologies for sealing batteries include relief valves that can vent gases to the environment. When the rate of gas generation is different from that used for stoichiometric recombination of hydrogen and oxygen gas to water, gas pressure in the battery increases. If the gas pressure in the battery becomes too high, the relief valves release gas to the environment, restoring safe pressure levels in the battery. Both increased pressure and release of gas are highly undesirable because increased pressure creates the risk of battery container rupture especially if the relief valve were to fail. Hydrogen and oxygen mixtures are flammable and can be explosive when released to the environment. Other health hazards arise if the hydrogen gas is concentrated enough to act as an asphyxiant or if minor gas components or particulates are released, such as hydrogen sulfide in the case of lead-acid batteries.

Significant effort has been made to maximize the rate of hydrogen and oxygen recombination. If a recombiner can keep gas pressure at safe levels (e.g., between about 7 and 70 kPa (about 1 and 10 psi)), the relief valve is not employed and safety concerns are decreased.

It would be extremely useful if new methods could be found for controlling gas pressures in sealed electrochemical cells so that the pressures remain within safe limits, a balanced state of charge between positive electrodes and negative electrodes is maintained, and battery efficiency is maximized.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

An electrochemical cell with an advanced gas management system is described, according to an embodiment of the invention. The cell has a sealed vessel partially filled with a liquid electrolyte, and a cathode, and anode and a third electrode at least partially submerged in the electrolyte. The third electrode is composed of material that catalyzes the electrolysis reaction when connected to either the anode or the cathode. There is a cathode circuit with a switch between the third electrode and the cathode and an anode circuit with a switch between the third electrode and the anode. In the headspace of the cell, a hydrogen gas pressure sensor can measure a hydrogen partial pressure and an oxygen gas pressure sensor can measure an oxygen partial pressure. There is also a microcontroller in communication with the anode switch, the cathode switch, the hydrogen gas pressure sensor and the oxygen gas pressure sensor.

In one embodiment of the invention, when the hydrogen (oxygen) partial pressure is too high relative to the oxygen (hydrogen) partial pressure, the microcontroller engages the switch in the cathode (anode) circuit to connect the third electrode with the cathode (anode), thus discharging the cathode (anode), producing additional oxygen (hydrogen) and reducing the hydrogen (oxygen) partial pressure.

DETAILED DESCRIPTION

The preferred embodiments are illustrated in the context of a nickel-zinc battery system. The skilled artisan will readily appreciate, however, that the materials and methods disclosed herein will have application in a number of other battery systems where gas management systems are useful.

DEFINITIONS

In this disclosure, the terms "negative electrode" and "anode" are both used to mean "negative electrode." Likewise, the terms "positive electrode" and "cathode" are both used to mean "positive electrode." The terms "headspace" and "common gas space" are both used to mean a space in the battery where there is not liquid electrolyte and where evolved gases can mix.

Although the disclosure herein is described in the context of nickel-zinc electrochemical cells with liquid electrolyte, it should be understood that the embodiments of the invention can also be used with other aqueous electrolyte chemistries where oxygen gas is generated by the cathode and hydrogen gas is generated by the anode and to electrolyte technologies that use absorbed glass mat or other methods for holding the electrolyte. Examples of such cell chemistries include, but are not limited to lead-acid, nickel metal-hydride, silver oxide, nickel-cadmium, manganese-zinc, nickel-zinc, and metallic lithium cells.

Throughout this disclosure, 20 kPa is often given as the pressure safety limit for sealed, aqueous electrolyte batteries. It should be understood that in actual practice, the pressure safety limit depends on many factors such as, the kind of chemistry, the type of application, and the strength of the battery case. The value of 20 kPa is meant as an example of a useful pressure safety limit of many conventional sealed, aqueous electrolyte batteries and is not meant to limit the invention in any way.

In a sealed aqueous electrolyte battery the relative state of charge of the electrodes is easily calculated from the ratio of hydrogen to oxygen gas concentration in the common gas space of the battery. It should be understood that, for the purposes of the embodiments of the invention, as described herein, partial pressure is directly related to concentration, and that relative partial pressure has the same value as relative concentration. If the anode (cathode) produces more gas than the cathode (anode), the cathode (anode) is at a higher state of charge than the cathode (anode). The cathode (anode) builds up to a higher state of charge and may eventually overcharge. An overcharged anode can cause a short circuit. Thus, the charge efficiency of the electrodes can be reduced by an amount proportional to the amount of gas generated there.

For example, toward the end of the charging cycle in nickel-zinc batteries, the nickel cathode generates oxygen much more rapidly than the anode generates hydrogen. This means that the anode is being charged up with more Coulombs per second than the cathode. If the imbalance in the generation of gases persists (e.g., over many charge-discharge cycles), the anode builds up a very thick layer of electrodeposited zinc which can ultimately cause short-circuit of the battery. Thus the molar concentration ratio of oxygen to hydrogen gas in the common gas space of the battery is a reliable metric for knowing the relative state of charge of the cathode as compared with the anode. Managing the electrodes so that the hydrogen to oxygen gas (generation) concentration ratio is 2:1 can help to ensure that the electrodes remain at the same state of charge, thus avoiding overcharge or overdischarge of either electrode. Current technology cannot manage the gases in the headspace to remain at a prescribed ratio and thus cannot balance the state of charge of the electrodes.

At present, it is not possible (without shutting down) to restore equal states of charge to battery electrodes once they have become unbalanced (unless they are purposely overdischarged). If the states of charge are different and the battery is fully discharged, the battery capacity is reduced or the battery can over-discharge one electrode, possibly damaging the electrode. With the new technology disclosed herein, it is now possible to discharge either electrode at will. Thus, when electrodes are found to have significantly different states of charge, balance can be restored at once. At the end of discharge the electrodes are ensured to be fully discharged, which is known to extend greatly the cycle life of nickel-zinc batteries. This new capability will prolong the cycle life of batteries and improve the charge capacity of even worn batteries.

In general, a recombiner in a battery cell begins to recombine hydrogen and oxygen to water at substantial rates once its temperature reaches a certain threshold, which usually cannot occur until each gas has a partial pressure of at least about 3.5 kPa (0.5 psi). If one gas is generated more than the other, a situation can arise where the less abundant gas does not have enough partial pressure for the recombiner to warm up and engage. If this situation persists, gas pressure can build up to unsafe levels as no recombination is occurring, forcing the relief valve to open and release gas to the environment. This sequence of events is what causes persistent pressure build up in many battery technologies and cannot be mitigated with current battery or recombiner technologies.

Figure 1:
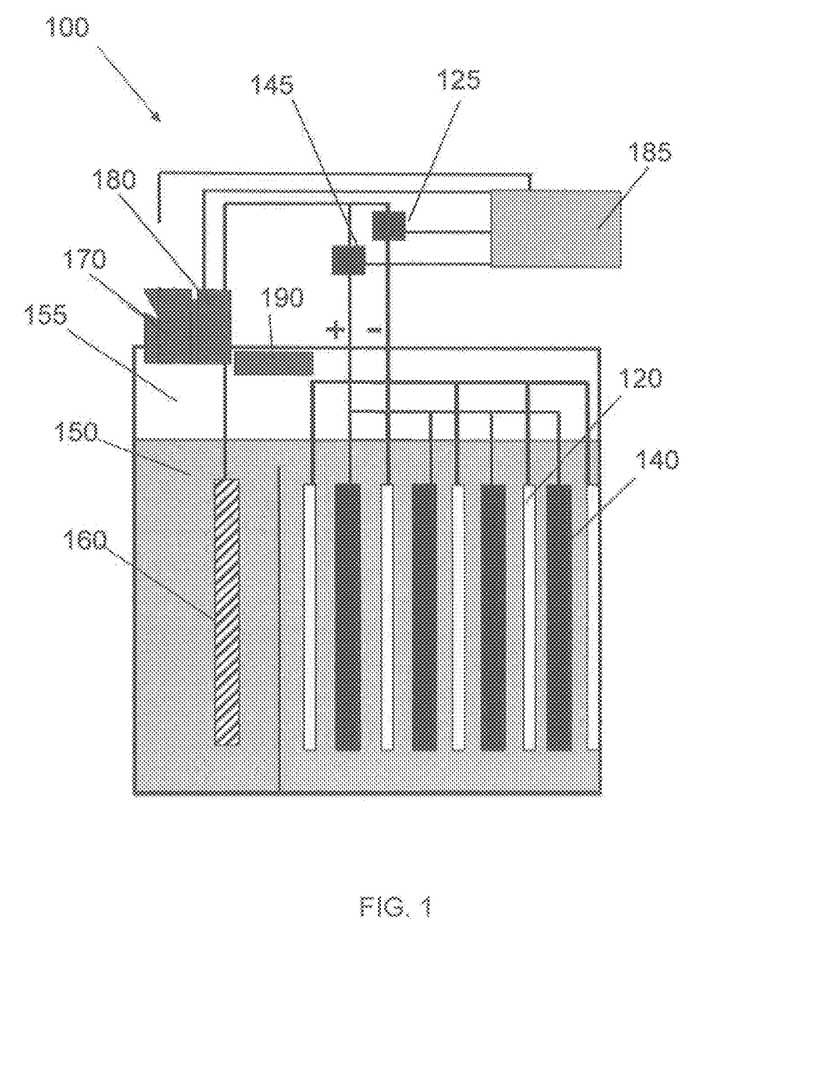
FIG. 1 is a schematic drawing of an electrochemical cell based on Ni—Zn chemistry, according to an embodiment of the invention.

An electrochemical cell 100 is shown in FIG. 1, according to an embodiment of the invention. The cell 100 has a series of NiOOH cathodes 120, Zn anodes 140, and at least one third electrode 160 made of catalytic material. In one arrangement, the catalytic material is a nickel plate or nickel foam. Examples of other materials that can be used include, but are not limited to, platinum, palladium, ruthenium oxide, NiMoZn, cobalt-oxo-phosphate, nickel cobalt oxygen evolving catalyst (NiCo-OEC), and other catalytic materials. Any appropriate catalytic material can be used to make the electrode, although using the catalytic material as a coating on a less expensive conductive material may be more cost-effective in some cases. All electrodes are set into an electrolyte bath 150 of potassium hydroxide solution in which ZnO has been dissolved. There is a headspace 155 that is free of liquid electrolyte, and in which evolved gases can gather. The third electrode 160 is connected to a cathode switch 125 that controls an electrically-conductive connection to the cathodes and to an anode switch 145 that controls an electrically-conductive connection to the anodes, as shown in FIG. 1. The third electrode 160 does not store electrochemical energy but is simply a catalyst for hydrogen or oxygen generation. There is a catalytic gas recombiner 190 (referred to simply as a "recombiner") in the headspace 155 of the cell 100, as shown in FIG. 1. The recombiner 190 can convert hydrogen and oxygen in the headspace 155 to water which can reenter the liquid electrolyte 150.

There is a set of sensors 170 and 180, both of which measure gas pressures in the headspace 155. There is a microcontroller 185 that receives the gas pressure information from the first gas sensor 170 and the second gas sensor 180. In one arrangement, the first gas sensor 170 is a hydrogen sensor and measures hydrogen partial pressure. The second gas sensor 180 is an oxygen sensor and measures oxygen partial pressure. In another arrangement, the first gas sensor 170 is either a hydrogen sensor or an oxygen sensor and measures hydrogen or oxygen partial pressure, respectively. The second gas sensor 180 measures total gas pressure, independent of species. The microcontroller 185 receives pressure information from the first gas sensor 170 and the second gas sensor 180 and uses that information to determine hydrogen and oxygen partial pressures and total pressure. This is done by appropriate addition or subtraction of the pressure data. The microcontroller 185 is programmed to close or open the cathode switch 125 or the anode switch 145 based on the pressure data it receives, as is described in more detail below.

In one embodiment of the invention, after initial assembly and before the battery is hermetically sealed, the partial pressures of hydrogen and oxygen gases in the cell 100 are measured and recorded in the microcontroller 185.

In another embodiment of the invention (not shown), there is only one pressure sensor in the headspace. The one sensor measures total gas pressure independent of the species. When the cell is first assembled, the headspace is filled with oxygen gas to a known pressure. Any significant increase in pressure is due mainly to increased oxygen, as increased hydrogen gas would be recombined with the oxygen already present in the head space. The microcontroller is programmed to close the anode switch, thus producing additional hydrogen, when the total gas pressure increases significantly and to open the anode switch once the total gas pressure returns to safe levels.

Under normal cell operation the anodes 140 are plated with metallic zinc during charge and are stripped of metallic zinc during discharge. A side reaction producing hydrogen gas occurs on the anodes. The NiOOH cathodes 120 remain solid with no dissolution into the electrolyte during charge and discharge. A side reaction that produces oxygen gas can occur at the cathodes toward the end of the charge cycle.

Gas generation at the anode occurs with water in the electrolyte by the electrolysis reaction:

$$2H_2O + 2e^- \leftrightarrow 2OH^- + H_2 \quad (1)$$

Gas generation at the cathode occurs with water in the electrolyte by the electrolysis reaction:

$$4OH^- \leftrightarrow 2H_2O + O_2 + 4e^- \quad (2)$$

Reactions (1) and (2) use electrons (Coulombs) that could have been used to charge the electrode during the battery charge operation. Therefore the number moles of gas generated is directly related to the moles of electrons (e.g., Coulombs) diverted from charging the electrode. The state of charge of the electrode (as measured in Coulombs) is reduced by an amount that can be calculated using the amount of gas that has been generated during the charge cycle. The loss of Coulombs is called "charge inefficiency." Since the battery is hermetically sealed, the total amount of gas generated can be determined by measuring the partial pressures in the headspace of the battery. The following expression gives the difference in state of charge (as a percentage of the total Coulombic capacity of the battery cell) between the anodes and the cathodes:

$$((O_{2pp} - O_{2i}) * 4) - (H_{2pp} - H_{2i}) * 2) * V * F / (R * T * C) * 100\% \quad (3)$$

where $O_{2pp}$ is oxygen partial pressure in the headspace, $O_{2i}$ is the initial partial pressure of oxygen when the electrodes were most recently balanced, $H_{2pp}$ is the hydrogen partial pressure in the headspace, $H_{2i}$ is the initial partial pressure of hydrogen when the electrodes were most recently balanced, V is the volume of gas in the headspace of the cell, R is the universal gas constant, T is the temperature in Kelvin, C is the total Coulombic capacity of the battery cell in Coulombs, and F is Faraday's constant. When the value of expression (3) is zero, the anode and the cathode have the same state of charge and they are balanced. When the value of expression (3) is greater than zero the anode has a higher state of charge than the cathode. When the value of expression (3) is less than 0, the cathode has a higher state of charge than the anode.

For example, if the value of expression (3) is 10%, then the SOC of the anode is higher than the SOC of the cathode by 10% of the total charge capacity of the battery cell. When the value of expression (3) is −15%, the SOC of the cathode is higher than the SOC of the anode by 15% of the total charge capacity of the cell.

The microcontroller 185 reads the pressure sensors, calculates the oxygen and hydrogen partial pressures, and calculates the SOC difference between the anode and the cathode. When the SOC of the cathodes is too high, the microcontroller 185 directs the cathode switch 125 to engage, connecting the third electrode 160 to the cathodes 120. When the third electrode 160 connects to the cathodes 120, electrons flow to the cathodes 120 from the third electrode, which catalyzes electrolysis at the third electrode, producing oxygen. The flow of charge from the cathodes 120 reduces the SOC of the cathodes. The increased amount of oxygen is available to be recombined with the excess hydrogen that was produced at the cathodes 120 as the cathode SOC had increased.

When the SOC of the anodes is too high, the microcontroller 185 directs the anode switch 145 to close, connecting the third electrode 160 to the anodes 140. When the third electrode 160 connects to the anodes 140, electrons flow from the anodes 140 into the third electrode, which catalyzes electrolysis at the third electrode, producing hydrogen. The flow of charge from the anodes 140 reduces the SOC of the anodes. The increased amount of hydrogen is available to be recombined with the excess oxygen that was produced at the anodes 140 as the anode SOC had increased.

Thus when there is a balanced state of charge between the anodes and cathodes, the value of expression (3) is at or near zero. The microcontroller operates the switches in response to changes in the value of expression (3)) to balance the state of charge between the cathodes 120 and the anodes 140. In arrangement, the microcontroller is configured to close the anode switch when the value of (3) is greater than a first threshold value, and to close the cathode switch when the value of (3) is less than a second threshold value. In some arrangements, the first threshold value is positive and can be any of about 40%, 25%, 15%, 5%, or 1%. In some arrangements, the second threshold value is negative and can be any of about 40%, 25%, 15%, 5%, or 1%.

An important benefit that can be achieved with the system described herein is that excessive metal electrodeposits on the anode can be avoided. The anode cannot accumulate an excessive amount of electrodeposited metal because the microcontroller is operating the switches to keep the states of charge of the cathodes and anodes in balance. This makes it possible to avoid both the short-circuiting problems that can occur as metal deposits accumulate on the anode. The third electrode allows easy removal of all electrodeposited metal from the anode, which is beneficial for some battery chemistries.

Figure 2:
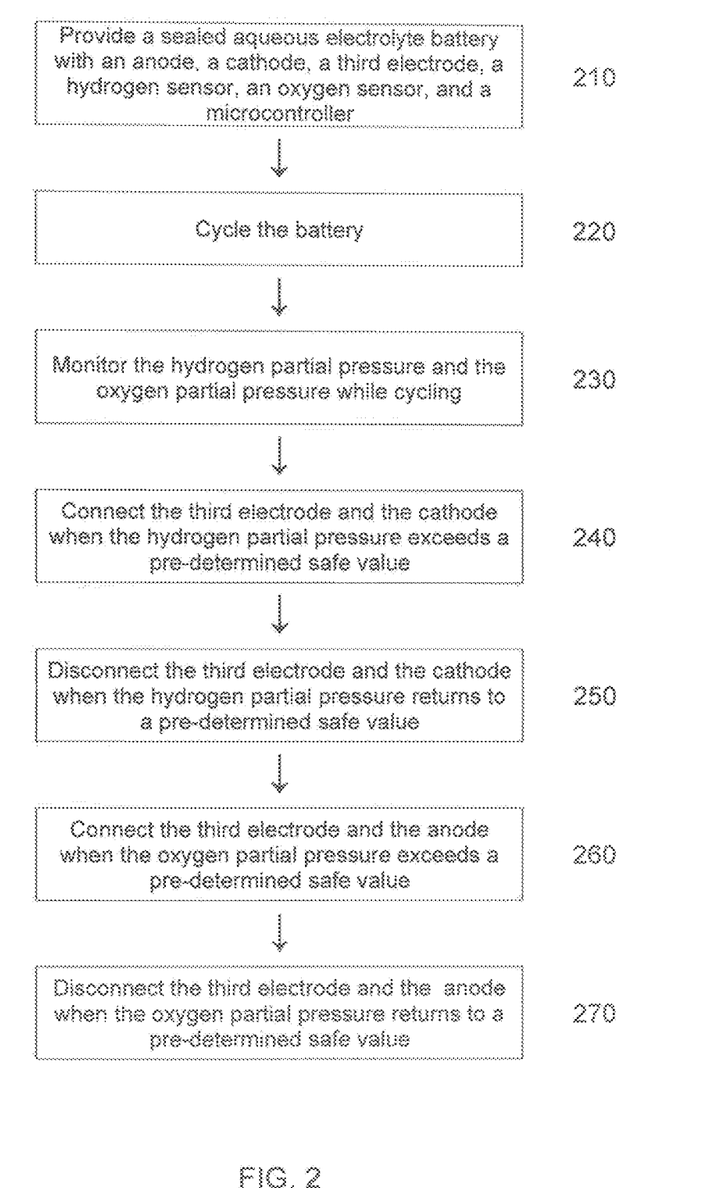
FIG. 2 is a process flow diagram that outlines the steps in operating a battery, according to an embodiment of the invention.

In one embodiment of the invention, a method of operating an aqueous electrolyte battery system is described in the process flow in FIG. 2. In step 210, a battery as described above with reference to FIG. 1 is provided. In step 220, the battery is cycled. In step 230, the hydrogen partial pressure and the oxygen partial pressure in the battery headspace are monitored during cycling. In one arrangement, the pressure is monitored at intervals of between about 0.5 seconds and 1 minute. In another arrangement, the pressure is monitored at intervals of between about 1 and 30 seconds. In another arrangement, the pressure is monitored at intervals of between about 1 and 10 seconds. In another arrangement, the pressure is monitored at intervals of about 5 seconds. In step 240, when the hydrogen partial pressure exceeds a pre-determined safe value (for example, 20 kPa), the third electrode makes an electrical connection to the cathode. In step 250, when the hydrogen partial pressure returns to a pre-determined safe value, the electrical connection between the third electrode and the cathode is broken. In step 260, when the oxygen partial pressure exceeds a pre-determined safe value (for example, 20 kPa), the third electrode makes an electrical connection to the anode. In step 270, when the oxygen partial pressure returns to a predetermined safe value, the electrical connection between the third electrode and the anode is broken.

Figure 3:
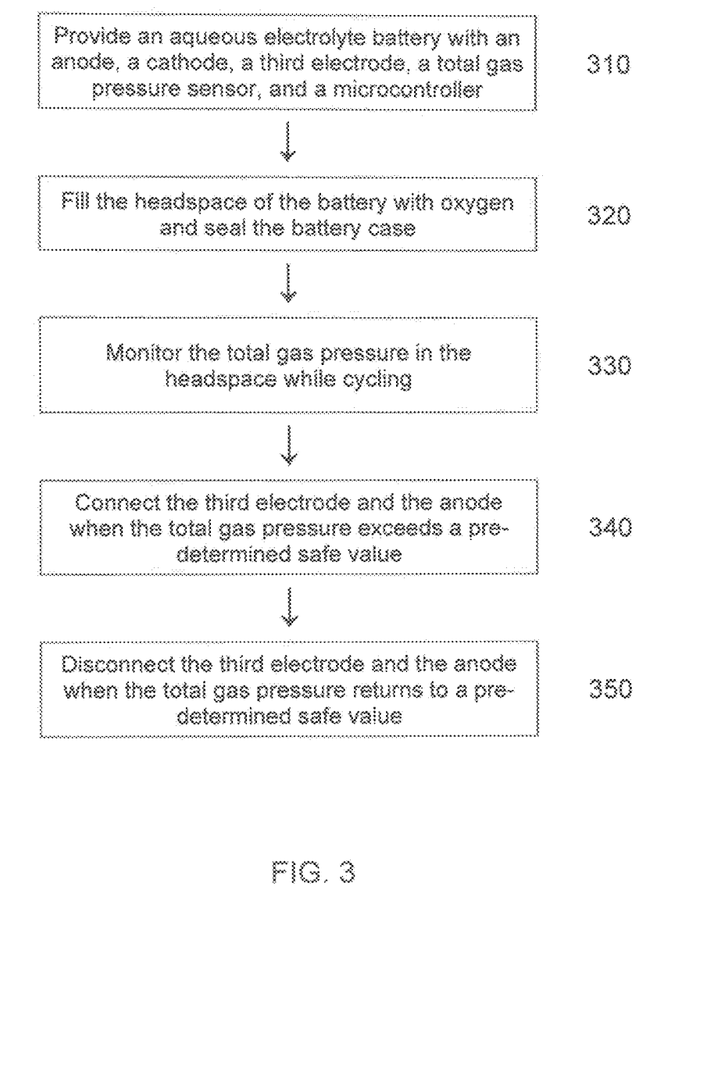
FIG. 3 is a process flow diagram that outlines the steps in operating a battery, according to another embodiment of the invention.

In another embodiment of the invention, a method of operating an aqueous electrolyte battery system is described in the process flow in FIG. 3. In step 310, a battery as described above with reference to FIG. 1 is provided. In step 320, the headspace of the battery is filled with oxygen gas and the battery case is sealed. In step 330, the total gas pressure in the battery headspace is monitored during cycling. In one arrangement, the pressure is monitored at intervals of between about 0.5 seconds and 1 minute. In another arrangement, the pressure is monitored at intervals of between about 1 and 30 seconds. In another arrangement, the pressure is monitored at intervals of between about 1 and 10 seconds. In another arrangement, the pressure is monitored at intervals of about 5 seconds. In step 340, when the total gas pressure exceeds a pre-determined safe value (for example, 20 kPa), the third electrode makes an electrical connection to the anode. In step 350, when the total gas pressure returns to a pre-determined safe value, the electrical connection between the third electrode and the anode is broken.

EXAMPLE

The following example provides details relating to composition, fabrication and performance characteristics of an electrochemical cell in accordance with some embodiments of the present invention. It should be understood the following is representative only, and that the invention is not limited by the detail set forth in this example.

A 34-Wh prototype battery cell was made from 8 NiOOH cathodes and 9 nickel-sheet anodes, all measuring about 10 cm×9 cm. An aqueous solution of 37% w/w potassium hydroxide and 60 g/L ZnO was used as the electrolyte. The cathodes were separated from the anodes by a 3 mm gap, and a pump forced flow of 0.5 cm/s through the channel formed by the gap. No membrane or separator was used. The sealed cell case was about 17 cm tall×6 cm wide×14 cm long. The third electrode was a single nickel foam sheet of the same size as the other electrodes. The cell was cycled at 95% of its total storage capacity during measurement of the data shown in the graph in FIG. 2 and achieved Coulombic efficiencies above 90% and energy efficiencies above 80%. A high-surface-area platinum recombiner was placed in the headspace of the cell.

Figure 4:
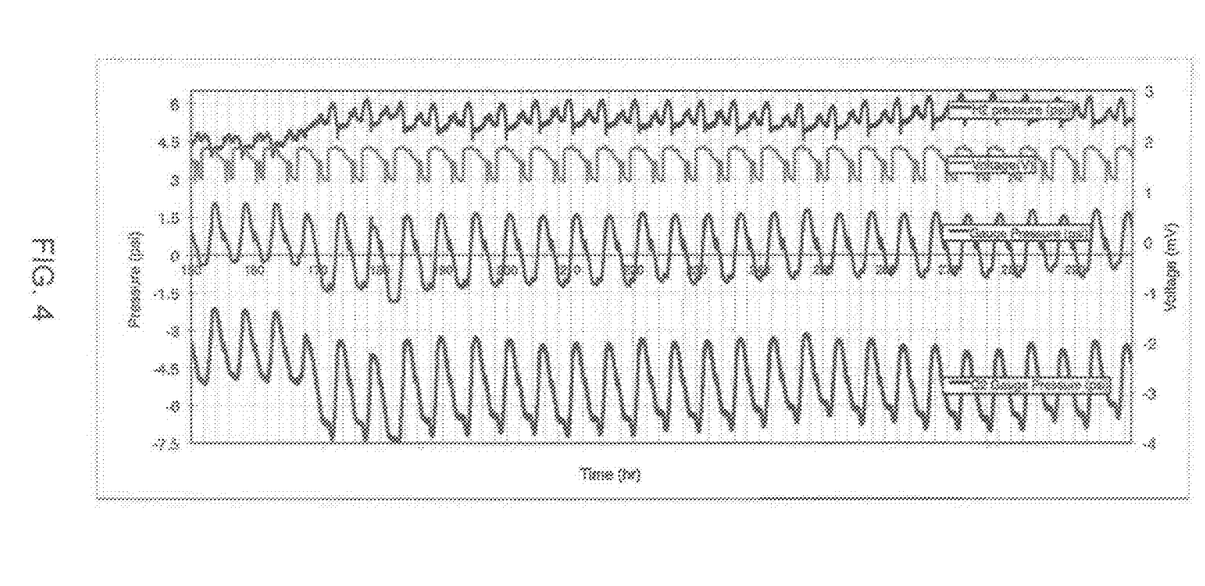
FIG. 4 shows a plot of pressure as a function of time for a sealed electrochemical cell, as discussed in the Example below.

FIG. 4 shows a plot of pressure as a function of time for the prototype battery cell. The prototype operated for more than 35 consecutive charge/discharge cycles with gas partial pressures remaining under about 20 kPa (3 psi).

The data in FIG. 4 show that a novel advance has been made for sealed flooded battery cell technology. Typically, pressure inside a sealed, flooded aqueous nickel hydroxide-zinc battery rises above the safety limit of about 35 kPa (5 psi) after two or three cycles and continues to rise to extreme pressures of about 70 to 700 kPa (10 to 100 psi) within ten cycles. Similar increases in pressure occur in a sealed flooded lead-acid battery. Because of this, the lead-acid industry has not been able to commercialize sealed, flooded lead-acid batteries. The data presented in FIG. 2 shows that the novel, new technology described herein allows operation of flooded aqueous batteries for an indefinite number of cycles by keeping gauge gas pressure below 20 kPa (3 psi) without having to vent gases to the environment.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:
1. An electrochemical cell, comprising:
a sealed vessel comprising a relief valve, said sealed vessel being partially filled with a liquid electrolyte;
a cathode at least partially submerged in the liquid electrolyte;
an anode at least partially submerged in the liquid electrolyte and not in direct contact with the cathode;
a third electrode at least partially submerged in the liquid electrolyte and not in direct contact with either the cathode or the anode;
a cathode circuit between the third electrode and the cathode wherein the cathode circuit contains a cathode switch;
an anode circuit between the third electrode and the anode wherein the anode circuit contains an anode switch;
a first gas pressure sensor within the sealed vessel, the first gas pressure sensor not in contact with the liquid electrolyte;
a second gas pressure sensor within the sealed vessel, the second gas pressure sensor not in contact with the liquid electrolyte; and
a microcontroller in communication with the anode switch, the cathode switch, the first gas pressure sensor and the second gas pressure sensor, wherein the microcontroller is configured to:
read the first gas pressure sensor and the second gas pressure sensor,
calculate oxygen partial pressure and a hydrogen partial pressure,
calculate a state of charge difference between the anode and the cathode using the oxygen partial pressure and the hydrogen partial pressure, close the anode switch when the difference in state of charge between the anode and the cathode is greater than a first threshold value, and close the cathode switch when the difference in state of charge between the anode and the cathode is less than a second threshold value.

2. The electrochemical cell of claim 1 wherein the cathode comprises an active material selected from the group consisting of oxidized states of lead, silver, manganese, nickel, and iron.

3. The electrochemical cell of claim 1 wherein the anode is an electrodeposited material selected from the group consisting of lead, zinc, cadmium, lithium, and iron.

4. The electrochemical cell of claim 1 wherein the third electrode comprises a material that can catalyze electrolysis.

5. The electrochemical chemical cell of claim 4 wherein the third electrode comprises a material selected from the group consisting of one or more of platinum, palladium, ruthenium oxide, nickel, NiMoZn, cobalt-oxo-phosphate, and nickel cobalt oxygen evolving catalyst (NiCo—OEC).

6. The electrochemical cell of claim 1 wherein the first gas pressure sensor is configured to measure hydrogen partial pressure, and the second gas pressure sensor is configured to measure oxygen partial pressure.

7. The electrochemical cell of claim 6 wherein the microcontroller is configured to close the anode switch as long as the hydrogen partial pressure is greater than a first pre-programmed safety limit and to close the cathode switch as long as the hydrogen partial pressure is less than a second pre-programmed safety limit.

8. The electrochemical cell of claim 1 wherein the first gas pressure sensor is configured to measure either hydrogen partial pressure or oxygen partial pressure, and the second gas pressure sensor is configured to measure total gas pressure.

9. The electrochemical cell of claim 8 wherein the microcontroller is configured to determine oxygen partial pressure and hydrogen partial pressure from measurements made by the first gas pressure sensor and the second gas pressure sensor.

10. The electrochemical cell of claim 1 wherein the microcontroller is configured to calculate the difference in the state of charge between the anode and the cathode using an expression:

$$((O_{2pp}-O_{2i})*4)-(H_{2pp}-H_{2i})*2)*V*F/(R*T*C)*100\%$$

wherein $O_{2pp}$ is oxygen partial pressure in a headspace, $O_{2i}$ is an initial partial pressure of oxygen, $H_{2pp}$ is a hydrogen partial pressure in the headspace, $H_{2i}$ is an initial partial pressure of hydrogen, V is a volume of gas in the headspace of the cell, R is the universal gas constant, T is a temperature in Kelvin, C is a total Coulombic capacity of the cell in Coulombs, and F is Faraday's constant.

11. The electrochemical cell of claim 10 wherein the first threshold value is +25%.

12. The electrochemical cell of claim 10 wherein the second threshold value is −25%.

* * * * *